United States Patent [19]
Thomson

[11] Patent Number: 5,934,446
[45] Date of Patent: Aug. 10, 1999

[54] BI-DIRECTIONAL VIBRATORY CONVEYOR

[75] Inventor: Thomas M. Thomson, Crystal Lake, Ill.

[73] Assignee: General Kinematics Corporation, Barrington, Ill.

[21] Appl. No.: 08/869,658

[22] Filed: Jun. 5, 1997

[51] Int. Cl.[6] .................................................. B65G 27/32
[52] U.S. Cl. .......................................................... 198/753
[58] Field of Search .................................... 198/753, 770, 198/759, 752.1

[56] References Cited

U.S. PATENT DOCUMENTS

| | | | |
|---|---|---|---|
| 2,079,360 | 5/1937 | Packer | 198/753 |
| 3,080,961 | 3/1963 | Allen et al. | 198/753 |
| 3,746,149 | 7/1973 | Schrader | 198/753 |
| 5,392,898 | 2/1995 | Burgess, Jr. et al. | 198/770 X |
| 5,460,259 | 10/1995 | Burgess, Jr. | 198/764 |
| 5,584,375 | 12/1996 | Burgess, Jr. et al. | 198/751 |
| 5,713,457 | 2/1998 | Musschoot | 198/753 |

FOREIGN PATENT DOCUMENTS

| | | | |
|---|---|---|---|
| 135017 | 10/1980 | Japan | 198/753 |
| 601204 | 4/1978 | U.S.S.R. | 198/753 |

*Primary Examiner*—James R. Bidwell
*Attorney, Agent, or Firm*—Wood, Philips, Van Santen, Clark & Mortimer

[57] ABSTRACT

Bearing failure and noise generation problems of prior art vibratory conveyors are eliminated in a construction including a trough 10 having an elongated, generally horizontal conveying surface 18 with opposed ends 14, 16. Resilient slats 20 mount the trough 12 above a base and an exciter mechanism including rotatable shafts 24, 52, each having an eccentric 28, 56 are connected via connecting arms 38, 84 to the trough 12 to vibrate the same in a horizontal plane. A bi-directional electric motor 78 is utilized as a drive.

16 Claims, 3 Drawing Sheets

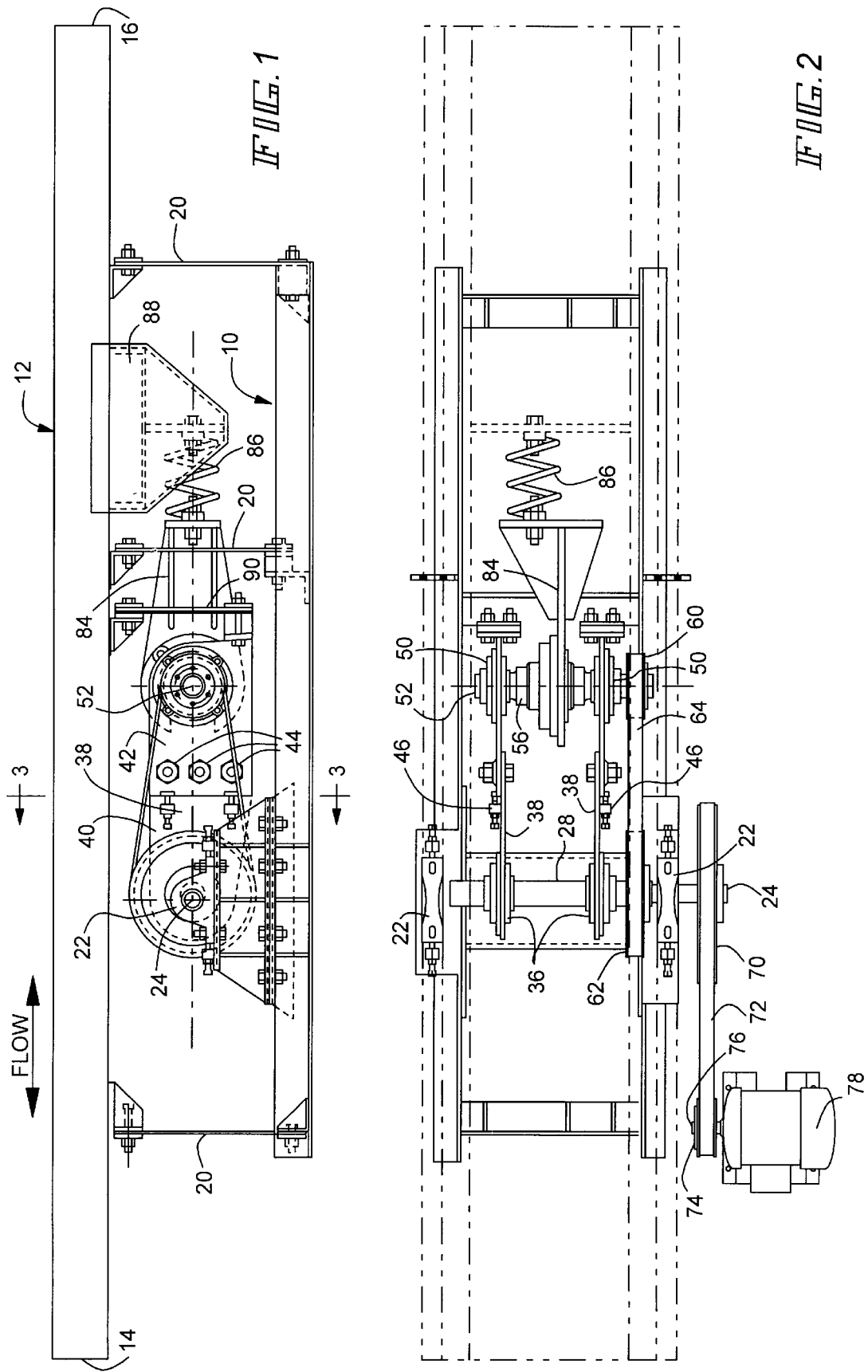

BI-DIRECTIONAL VIBRATORY CONVEYOR

FIELD OF THE INVENTION

This invention relates to vibratory conveyors, and more particularly, to a vibratory conveyor that conveys in either of two directions with equal facility.

BACKGROUND OF THE INVENTION

Two-way vibratory conveyors or feeders have substantial applications in a variety of fields. One typical application is in foundry operations. For example, castings may be delivered to the conveyor at a location intermediate its ends and then the conveyor energized to feed the castings to one end or the other depending upon where it is desired to locate the casting.

A typical two-way conveyor made according to the prior art by the assignee of this application will typically include an elongated bed with an upwardly facing, generally horizontal conveying or feeding surface terminating at opposite ends. The bed is supported on isolation springs adjacent the ends which in turn serve to elevate and mount the bed above the underlying terrain, such as the floor in a factory building or the like.

Two motor and weight assemblies are secured to the bed generally centrally thereof. Each will usually include a squirrel cage motor having a rotary output shaft to which is secured an eccentrically mounted weight. Springs in the form of plastic or fiberglass slats connect each of the motors to the bed. The motor and weight systems are typically canted at approximately 45 degrees to the bed with one being canted in one direction and the other being canted in the opposite direction. In operation, to convey in one direction, one of the systems is energized and vibration resulting from eccentric revolution of the weight associated therewith will cause flow along the bed in one direction. When it is desired to convey or feed in the opposite direction, that system is de-energized and the other motor and weight system is energized.

In many applications, it is not unusual that there is a considerable disparity between the amount of use of the two motor and weight systems. When that occurs, so called "false brinnelling" of the motor bearings in the motor associated with the least used motor and weight system will occur as a result of the vibration imparted to the bed. Lubricant may be squeezed out of the bearings as a result. As a consequence, when that system is finally energized, it may fail relatively quickly as a result of bearing failure caused by the false brinnelling and the resulting insufficient lubrication of the bearings.

Moreover, in foundry applications, it will be necessary that the bed be formed of metal to stand up to continued pounding of castings. In a prior art system such as described, vertical acceleration of the conveying or feeding surface during operation will typically exceed that of gravity. As a result, after the conveying surface has reached its highest point of movement in a cycle, it will be accelerated downwardly more rapidly than a casting or the like on the surface. The casting will be temporarily suspended above the surface but will eventually collide with the same as movement of the surface begins to reverse while the casting is being moved downwardly under the influence of gravity. The result is a noise producing impact of the casting upon the metal of which the bed is formed, the level of which will typically be undesirably high.

It will also be appreciated that the provision of two motor and weight systems when only one is used at any given time adds considerably to the cost of the apparatus.

In U.S. Pat. No. 3,746,149, there is proposed a reversible vibratory feeder that utilizes but a single motor and weight system. Feed direction is changed by tuning dynamic vibration absorbers in the form of air springs. This system eliminates some of the difficulties associated with the system previously described but is unduly complex in that at least eight air springs and considerable associated piping along with control valves is required. Consequently, it, too, is costly and difficult to use.

The present invention is directed to overcoming one or more of the above problems.

SUMMARY OF THE INVENTION

It is the principal object of the invention to provide a new and improved two-way or reversible vibratory feeder or conveyor. More specifically, it is an object of the invention to provide such a conveyor wherein the problem of premature bearing failure is eliminated; the noise produced during operation is substantially reduced; and the cost of construction is reduced through the use of a relatively simple exciter mechanism.

An exemplary embodiment of the invention achieves the foregoing object in a vibratory conveyor that includes a means defining a generally horizontal, elongated, conveying surface along with a base. A plurality of generally vertically arranged, resilient slats connect the surface defining means and the base. An exciter is mounted to the surface defining means and includes rotary eccentric means for vibrating the surface defining means in a generally horizontal direction by imparting a cyclic vibratory force to the surface defining means in the form of a skewed sine wave. Means are provided for rotationally driving the rotary eccentric means.

In a preferred embodiment, the driving means is a reversible motor having a bi-directional rotary output shaft connected to the rotary eccentric means.

In one embodiment, the rotary eccentric means comprises two parallel eccentric shafts and the drive means drives the shafts at different speeds.

In a preferred embodiment, the eccentric of one of the shafts has a greater displacement from the axis of rotation of the associated shaft than the eccentric of the other shafts.

In a highly preferred embodiment, the eccentrics are out of phase with one another and in a preferred embodiment, they are approximately 90 degrees out of phase with one another.

In one embodiment, the rotary eccentric means includes two parallel eccentric shafts with one of the shafts being journaled on the base. A support is provided and the other of the shafts is journaled on the support. The support is connected to the eccentric of one shaft and the eccentric of the other shaft is connected to the surface defining means. The eccentric of the one shaft has a greater displacement from the axis of rotation of the one shaft than the eccentric of the other shaft and the eccentrics are approximately 90 degrees out of phase with one another.

In a preferred embodiment, a first sheave is mounted on the eccentric of the one shaft for rotation therewith and a second sheave is mounted on the other shaft for rotation therewith. A belt is trained about the sheaves. As a result, provision for rotation of the second shaft is achieved by rotating the same in the same orbit as the eccentric of the first shaft.

In a highly preferred embodiment, there is a provided a bi-directional vibratory conveyor that includes means defining a generally horizonal, elongated conveying surface along with a base and a plurality of generally vertically arranged, resilient slats connecting the surface defining means and the base. The first shaft is journaled for rotation about a first axis generally transverse to the direction of elongation of the surface defining means. The first shaft has a first eccentric. A second shaft is generally parallel to and spaced from the first shaft and journaled about a second axis. The second shaft has a second eccentric. The first eccentric is displaced from the first axis a distance greater than the displacement of the second eccentric from the second axis and the first and second eccentrics are about 90 degrees out of phase with one another. A first connecting rod connects the first eccentric and journals the second shaft. A second connecting rod is connected between the second eccentric and the surface defining means. Means are provided for driving the first and second shafts in timed relation at a 1:2 rotational rate ratio and a motor having a reversible output is connected to the driving means for causing, for one direction of rotation, the first eccentric to lead the second eccentric by about 90 degrees and for the opposite direction of rotation, said first eccentric to lag said second eccentric by about 90 degrees. As a consequence, by reversing the motor output, the conveying direction may be reversed.

Other objects and advantages will become apparent from the following specification taken in connection with the accompanying drawings.

DESCRIPTION OF THE DRAWINGS

FIG. 1 is a side elevation of a bi-directional vibratory conveyor made according to the invention with certain parts omitted for clarity;

FIG. 2 is a plan view of the vibratory conveyor with the conveying surface removed;

DESCRIPTION OF THE PREFERRED EMBODIMENT

Figure 3:
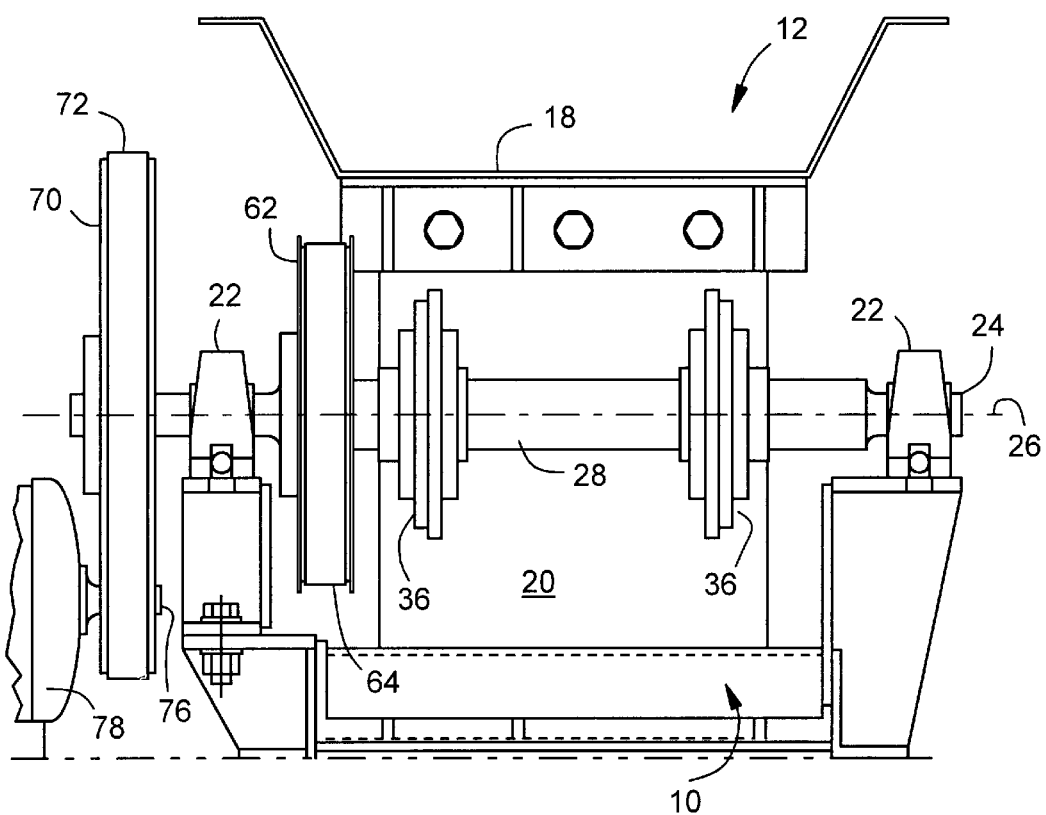
FIG. 3 is a sectional view taken approximately along the line 3—3 in FIG. 1.

An exemplary embodiment of a bi-directional vibratory conveyor or feeder is illustrated in the drawings and will be described herein as a conveyor, it being understood that the terms conveyor and feeder are synonymous for purposes of the present application. The conveyor includes a base, generally designated 10, which may be mounted on the underlying terrain as, for example, the floor of a building, a table like structure or the like. Supported above the base 10 is a generally horizonal, elongated, trough 12 having opposed ends 14 and 16 (FIG. 1) as well as an upper conveying surface 18 (FIG. 3). The trough 12 is supported above the base 10 by means of a series of vertically arranged, resilient slats 20 of conventional construction that are secured to both the underside of the trough 12 and to the base 10 at spaced locations along the latter.

Figure 4:
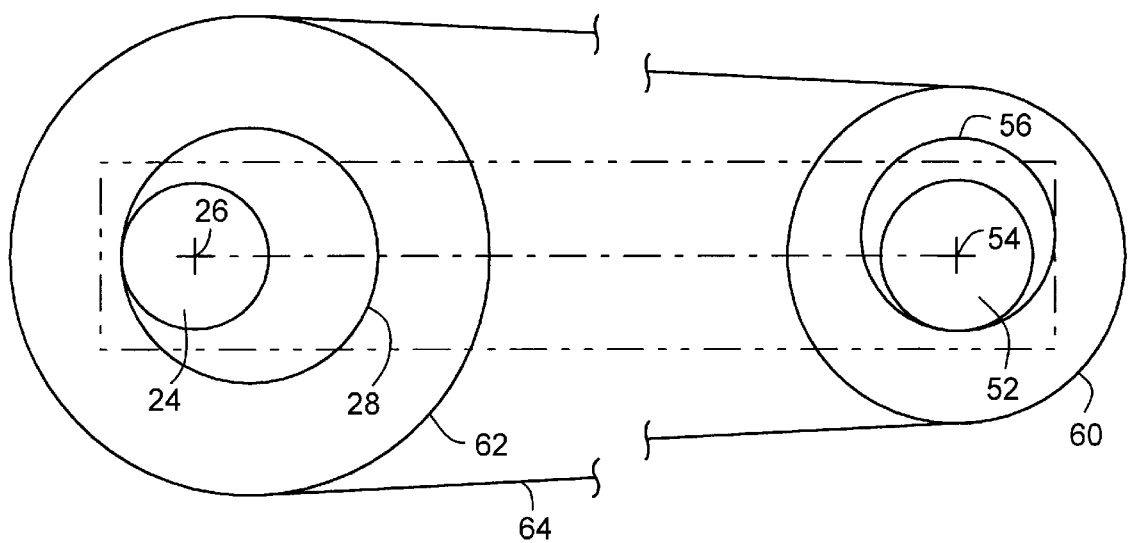
FIG. 4 is a schematic of part of an exciter used in the preferred embodiment of the invention.

Pillow block bearings 22 on the base 10 journal a first shaft 24 for rotation about a first axis 26 (FIG. 4). As can be seen from FIGS. 1–3, the axis 26 is generally transverse to the direction of elongation of the trough 12.

The shaft 24 includes a first eccentric 28 as seen in FIGS. 1 and 4. Flange bearings 36 are journaled on the first eccentric 28 and mount parallel connecting arms 38. In a preferred embodiment, each of the connecting arms is made up of a first section 40 and a second section 42 connected together by a series of threaded fasteners 44. Slots (not shown) receiving the threaded fasteners 44 allow the relative positions of the sections 40 and 42 to be changed and conventional adjustable stop mechanisms 46 are located on each of the sections 40 for facilitating the adjustment.

Flange bearings 50 are located on each of the sections 42 and journal a second shaft 52 for rotation about an axis 54 that is parallel to the axis 26 and spaced therefrom. The second shaft 52 includes a second eccentric 56. As seen in FIG. 4, the eccentric 56 extends in the upward direction and thus is 90 degrees out of phase with the first eccentric 28 on the first shaft 24 which extends horizontally.

A sheave 60 is mounted on one end of the second shaft 52 while a sheave 62 is mounted on a corresponding end of the first eccentric 28. It is important to note that the sheave 62 is mounted on the eccentric 28 rather than on the shaft 24 itself The purpose of this construction will become apparent hereinafter.

A timing belt 64 is trained about the sheaves 60 and 62 so that the two rotate in timed relation with one another. It is to be particularly noted that the relative size of the sheaves 60 and 62 is such that the sheave 60 will make two revolutions for each revolution of the sheave 62. The shaft 24, as opposed to the eccentric 28, mounts a second sheave 70. A belt 72 is trained about the sheave 70 and a sheave 74 on the rotatable output shaft 76 of a reversible electric motor 78. As a consequence, by energization of the motor 78, the shafts 24 and 52 may be simultaneously rotated in one direction or simultaneously rotated in the other direction. In the first case, because of the 90 degree out of phase relationship between the eccentrics 28 and 56, the second eccentric 56 will lag the first eccentric 28 by 90 degrees while for the other direction of rotation of the output shaft 76 of the motor 78, the second eccentric 56 will lead the first eccentric 28 by 90 degrees.

Because the sheave 62 is mounted on the first eccentric 28 along with the connecting arms 38 which in turn mounts the second shaft, the distance between the center of the sheave 62 and the centers of the shaft 52 and the sheave 60 will remain constant, allowing the use of the timing belt to drive the shaft 52 from the shaft 24. That is to say, the sheaves 60 and 62 are caused to revolve in the same orbit through this construction.

Returning to FIGS. 1 and 2, a second connecting arm 84 is mounted by a flange bearing 85 on the second eccentric 56. The second connecting arm 84 is connected via a relatively stiff coil spring 86 to a mounting bracket 88 secured to the trough 12 at its underside. As a consequence of the foregoing, vibration generated by rotation of the shafts 24 and 52 is ultimately conveyed to the bracket 88 and thus to the horizontal conveying surface 18.

The general structure is completed through the use of resilient support slat 90 which are connected between the underside of the trough 12 and the end of the first connecting arm 38 journaling the shaft 52. The sole purpose of the slats 90 is to prevent the connecting arm assembly including the arms 38 and 84 from sagging. And while the slats 90 are shown as interconnecting the first connecting arm 38 with the trough 12, the connection could just as well, and preferably is, made to the base 10.

Returning to FIG. 4, it will be seen that the eccentric 28 is displaced from the rotational axis 26 of the shaft 24. It will also be seen that the eccentric 56 is displaced from the rotational axis 54 of the shaft 52. Finally, it will be noted that the displacement of the eccentric 28 relative to the axis 26 is greater than the displacement of the eccentric 56 to the axis 54. In one preferred embodiment, the ratio of the two displacements is 3.2:1.

Figure 5:
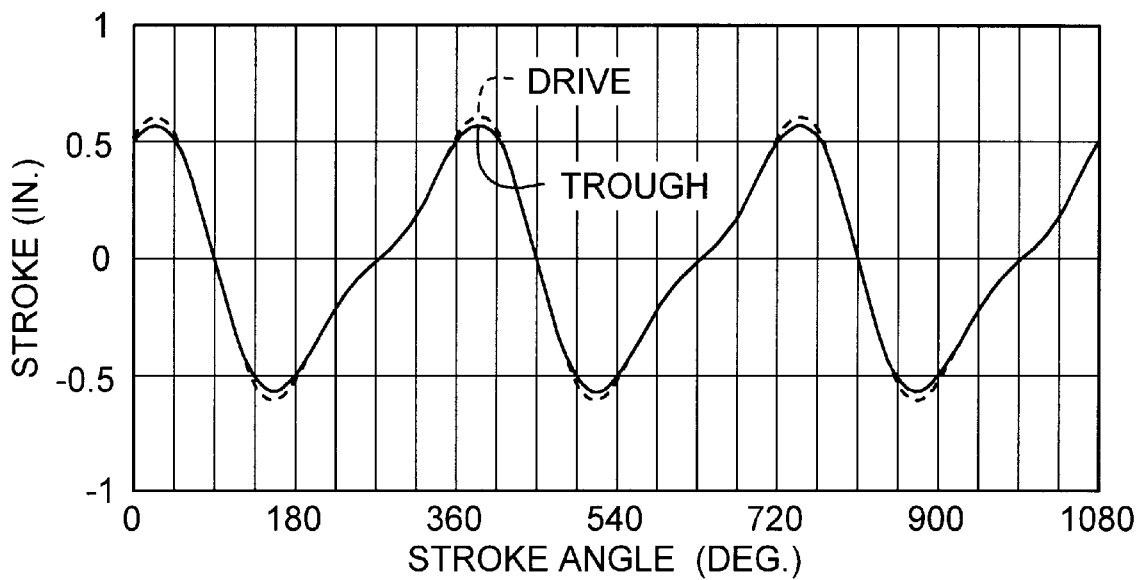
FIG. 5 is a graph plotting stroke versus stroke angle of both the drive and the conveying surface for one conveying direction.
Figure 6:
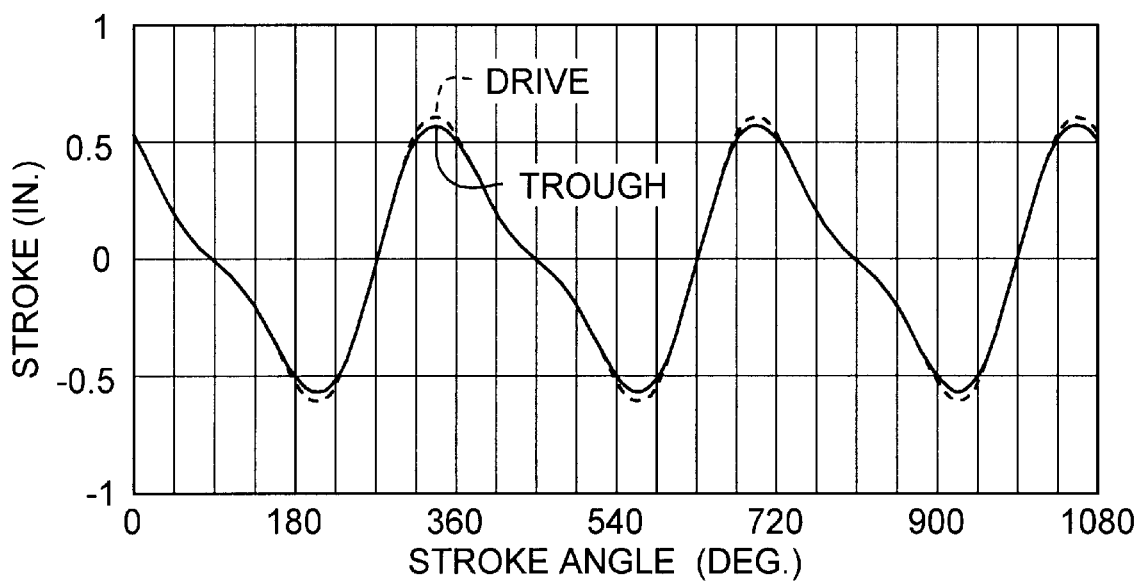
FIG. 6 is a view similar to FIG. 5 but plotting stroke versus stroke angle for the opposite conveying direction.

FIGS. 5 and 6 are graphs of the stroke in inches of both the drive (at the point of connection of the second connecting rod 84 to the spring 86) and of the trough 12 itself FIG. 5 represents the occurrence for one direction of rotation of the output shaft 76 of the motor 78 while FIG. 6 illustrates the same information but for the opposite direction of rotation of the output shaft 76.

In both cases, it will be seen that the wave form is what may be termed a "skewed sine wave" in that the slope of one side of each wave is shallower than the slope of the other side of the wave. Thus, if the vibrational pattern illustrated by FIG. 5 is being applied to the components in the manner illustrated in FIGS. 1 and 2, movement of the trough 12 to the right, that is toward the end 16, will be relatively slow while the return movement toward the end 14 will be relatively fast. In this case, conveying will be to the right because the slow movement to the right will allow the material being conveyed to frictionally engage and be advanced in that direction by the conveying surface 18. On the other hand, the fact that the return is so rapid, and the fact that the material still contains momentum energy from the rightward stroke will result in little or no reverse movement during the return stroke. The net result will be conveying of the material to the right.

When the operation is as in FIG. 6, the opposite will occur. A relatively simple analogy is found in the "magical" trick of pulling a tablecloth off of a table with dishes on the tablecloth. If the tablecloth is pulled slowly, the dishes will come off of the table with the cloth. On the other hand, if the tablecloth is moved rapidly, the dishes will stay on the table. In the case of the present invention, slow movement of the tablecloth corresponds to the conveying stroke while fast movement of the tablecloth corresponds to the return stroke.

Amplitude of the stroke is determined by the ratio of the displacements of the first and second eccentrics 28 and 56 to the respective axis of rotation 26 and 54. To achieve equally good conveying in either direction, it is preferred that the phase difference between the eccentrics 28 and 56 be exactly 90 degrees. However, if unequal conveying rates are desired, or if a particular use of the invention does not require conveying with equal efficiency in either direction, then the 90 degrees phase difference may be altered by as much as perhaps 90 degrees.

Though actual tests have not been performed to verify the point, it preliminarily appears that the 1:2 rotational rate ratio between the shafts 24 and 52 is important for proper operation. If other ratios are chosen, they appear to introduce secondary sine waves upon the skewed sine wave of FIG. 5 or FIG. 6 which interfere with proper conveying.

From the foregoing, it will be appreciated that a bi-directional vibratory conveyor made according to the invention produces a number of advantages over prior art apparatus. For one, the exciter assembly is relatively simple in construction. As it is always in use, whether the conveyor is conveying to the right or to the left as viewed in FIG. 1, the problem of false brinnelling is eliminated.

Secondly, it will be appreciated that the conveying surface 18 is moved virtually entirely in a horizontally plane. As a consequence, noise generated by the objects being conveyed impacting with the conveying surface 18 is virtually eliminated.

Moreover, as the invention eliminates vertical dynamic gravitational forces, the foremost cause of stress failures in a conveyor of the vibratory through is eliminated. Consequently, a long lived conveyor is provided.

In addition, reversing of the direction of conveying is simply achieved simply through the use of a reversible electric motor and an appropriate reversing control therefore.

It will therefore be appreciated that a bi-directional vibratory conveyor made according to the invention provides a considerable advance over the prior art.

I claim:

1. A bi-directional vibratory conveyor, comprising;

means defining a generally horizontal, elongated conveying surface;

a base;

a plurality of generally vertically arranged, resilient slats connecting said surface defining means and said base;

a first shaft journalled for rotation about a first axis generally transverse to the direction of elongation of said surface defining means, said first shaft having a first eccentric;

a second shaft generally parallel to and spaced from said first shaft and journalled about a second axis, said second shaft having a second eccentric;

said first eccentric being displaced from said first axis a distance greater than the displacement of said second eccentric from said second axis;

said first and second eccentrics being about 90 degrees out of phase with one another;

a first connecting arm connected to said first eccentric and journaling said second shaft;

a second connecting arm connected between said second eccentric and said surface defining means;

means for driving said first and second shafts in timed relation at a 1:2 rotational rate ratio and a motor having a reversible output connected to said driving means for causing for one direction of rotation, said first eccentric to lead said second eccentric by about 90 degrees and for the opposite direction of rotation, said first eccentric to lag said second eccentric by about 90 degrees;

whereby, by reversing said motor output, the conveying direction may be reversed.

2. A vibratory conveyor comprising:

means defining a generally horizontal elongated surface;

a base;

a plurality of generally vertically arranged, resilient slats connecting said surface defining means at said base;

an exciter mounted to said surface defining means and including a rotary eccentric means having two parallel, eccentric shafts, and a link extending between said eccentric shafts and rotatably connected to each of said eccentric shafts for vibrating said surface defining means in a generally horizontal direction by imparting a cyclic vibratory force to said surface defining means in the form of a skewed sine wave; and means for rotational driving said eccentric shafts at different speeds.

3. The vibratory conveyor of claim 2 wherein said driving means is a reversible motor having a bi-directional rotary output shaft connected to said rotary eccentric means.

4. The vibratory conveyor of claim 2 wherein the eccentric of one of said shafts has a greater displacement from the axis of rotation of the associated shaft than the eccentric of the other of said shafts.

5. The vibratory conveyor of claim 2 wherein said eccentrics are out of phase with one another.

6. The vibratory conveyor of claim 5 wherein said eccentrics are approximately 90 degrees out of phase with one another.

7. A vibratory conveyor comprising:

means defining a generally horizontally elongated surface;

a base;

a plurality of generally vertically arranged, resilient slats connecting said surface defining means and said base;

an exciter mounted to said surface defining means and including rotary eccentric means for vibrating said surface defining means in a generally horizontal direction by imparting a cyclic vibratory force to said surface defining means in the form of a skewed sine wave; and means for rotationally driving said rotary eccentric means;

said rotary eccentric means including two parallel eccentric shafts, one of said shafts being journaled on said base;

a support;

the other of said shafts being journaled on said support;

said support being connected to the eccentric of said one shaft;

the eccentric of said other shaft being connected to said surface defining means;

the eccentric of said one shaft having a greater displacement from the axis of rotation of said one shaft than the eccentric of said other shaft;

the eccentrics of said shafts being approximately 90° out of phase with one another.

8. The vibratory conveyor of claim 7 wherein said driving means is a reversible motor having a bi-directional rotary output shaft connected to said rotary eccentric means.

9. The vibratory conveyor of claim 7 including a first sheave mounted on the eccentric of said one shaft for rotation therewith, and a second sheave mounted on said other shaft for rotation therewith; and a belt trained about said sheaves.

10. The vibratory conveyor of claim 7 wherein said eccentric of said other shaft is connected to said surface defining means by a resilient connection.

11. The vibratory conveyor of claim 10 wherein said resilient connection includes a coil spring.

12. A bi-directional vibratory conveyor, comprising;

means defining a generally horizontal, elongated conveying surface;

a base;

a plurality of generally vertically arranged, resilient slats connecting said surface defining means and said base;

a first shaft journalled for rotation about an axis generally transverse to the direction of elongation of said surface defining means, said first shaft having a first eccentric;

a second shaft generally parallel to and spaced from said first shaft, said second shaft having a second eccentric;

said first and second eccentrics being out of phase with one another;

a first connecting arm connected to said first eccentric and journaling said second shaft;

a second connecting arm connected between said second eccentric and said surface defining means;

means for driving said first and second shafts in timed relation; and means for selectively changing the phasing between said eccentrics to provide bidirecitonal conveying movement.

13. The vibratory conveyor of claim 12 wherein said selective changing means comprise means for alternatively causing said first eccentric to a) lead said second eccentric or b) lag said second eccentric.

14. The vibratory conveyor of claim 13 wherein said alternative causing means cause said first eccentric to lead or lag said second eccentric by about 90 degrees.

15. The vibratory conveyor of claim 13 wherein said driving means is a positive drive establishing a fixed relation between said eccentrics and said alternative causing means comprises means for rotating said shafts in one direction to cause said first eccentric to lead said second eccentric and for rotating said shafts in the opposite direction to cause said first eccentric to lag said second eccentric.

16. The vibratory conveyor of claim 15 wherein said means for rotating comprises a reversible motor.

* * * * *